US012626547B2

(12) United States Patent
Kim et al.

(10) Patent No.: US 12,626,547 B2
(45) Date of Patent: *May 12, 2026

(54) METHOD OF GENERATING VIRTUAL TIRE SLIP SOUND IN VEHICLE

(71) Applicants: Hyundai Motor Company, Seoul (KR); Kia Corporation, Seoul (KR)

(72) Inventors: Ki Chang Kim, Seoul (KR); Jin Sung Lee, Seoul (KR); Dong Chul Park, Seoul (KR); Tae Kun Yun, Seoul (KR); Sang Jin Hong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 21 days.

This patent is subject to a terminal disclaimer.

(21) Appl. No.: 18/757,733

(22) Filed: Jun. 28, 2024

(65) Prior Publication Data

US 2024/0346862 A1 Oct. 17, 2024

Related U.S. Application Data

(63) Continuation of application No. 17/411,518, filed on Aug. 25, 2021, now Pat. No. 12,051,290.

(30) Foreign Application Priority Data

Dec. 31, 2020 (KR) ........................ 10-2020-0189483

(51) Int. Cl.
*G07C 5/08* (2006.01)
*G07C 5/02* (2006.01)
(Continued)

(52) U.S. Cl.
CPC ............. *G07C 5/0833* (2013.01); *G07C 5/02* (2013.01); *G10K 15/02* (2013.01); *H04R 3/00* (2013.01); *H04R 2499/13* (2013.01)

(58) Field of Classification Search
CPC ........ G07C 5/0833; G07C 5/02; G10K 15/02; H04R 3/00; H04R 2499/13; B60Q 9/00;
(Continued)

(56) References Cited

U.S. PATENT DOCUMENTS

2007/0269054 A1 11/2007 Takagi et al.
2017/0353570 A1 12/2017 Hayashi et al.

FOREIGN PATENT DOCUMENTS

JP H 06162365 A 6/1994
JP H06219227 A * 8/1994
(Continued)

*Primary Examiner* — Rodney A Butler
(74) *Attorney, Agent, or Firm* — Fox Rothschild LLP

(57) ABSTRACT

A method of generating a tire slip sound is capable of producing a virtual tire slip sound in a driving situation in which tire slip may occur during vehicle driving. The method includes collecting vehicle driving information while a vehicle is traveling; determining a characteristic of a virtual tire slip sound based on the collected vehicle driving information; generating and outputting a tire slip signal for generating and outputting the virtual tire slip sound according to the determined characteristic; and operating sound equipment of the vehicle according to the tire slip signal output from the controller to generate and output the virtual tire slip sound according to a vehicle driving state.

10 Claims, 8 Drawing Sheets

(51) Int. Cl.
*G10K 15/02* (2006.01)
*H04R 3/00* (2006.01)

(58) Field of Classification Search
CPC .... B60Q 5/008; B60R 16/0232; B60W 50/14; B60W 10/20; B60W 40/10; B60W 40/12; B60W 2050/0002; B60W 2050/143; B60W 2520/16; B60W 2520/26; B60W 2540/18; B60Y 2200/91
See application file for complete search history.

(56) References Cited

FOREIGN PATENT DOCUMENTS

| | | | |
|---|---|---|---|
| KR | 20180020399 | A | 2/2018 |
| KR | 10-1926990 | B1 | 12/2018 |
| KR | 10-1947317 | B1 | 2/2019 |
| KR | 10-2019-0051451 | A | 5/2019 |
| KR | 20190127433 | A | 11/2019 |

* cited by examiner $cf_1+cf_2+cf_3+cf_4$=CENTRIFUGAL FORCE, cf=CORNERING FORCE

METHOD OF GENERATING VIRTUAL TIRE SLIP SOUND IN VEHICLE

CROSS-REFERENCE TO RELATED APPLICATION

This application is a Continuation of U.S. patent application Ser. No. 17/411,518, filed on Aug. 25, 2021, which claims under 35 U.S.C. § 119 (a) the benefit of Korean Patent Application No. 10-2020-0189483 filed on Dec. 31, 2020, the entire contents of which are incorporated herein by reference.

BACKGROUND

(a) Technical Field

The present disclosure relates to a method of generating a tire slip sound, which is capable of producing a virtual tire slip sound in a vehicle in a driving situation in which tire slip may occur during vehicle driving.

(b) Description of the Related Art

As is known, an electric vehicle (EV) is a vehicle that utilizes a motor as a power source. A drive system of the EV includes a battery configured to supply electric power for driving the motor, an inverter connected to the battery and configured to drive and control the motor, the motor connected to the battery through the inverter and configured to charge or discharge the battery as a vehicle driving source, and a reduction gear configured to reduce a rotating force of the motor and transmit the reduced rotating force to a driving wheel.

In particular, when the motor is driven, the inverter serves to convert a direct current (DC) supplied from the battery into an alternating current (AC) and apply the AC current to the motor through a power cable, and when the motor is regenerated, the inverter serves to convert an AC current generated by the motor into a DC current and then supply the DC current to the battery, thereby charging the battery.

Unlike an existing internal combustion engine vehicle, in a conventional EV, a multi-stage transmission is not used, and in place of the multi-stage transmission, a reduction gear using a fixed gear ratio is disposed between the motor and the driving wheel. This is because, unlike the internal combustion engine which has a wide range of an energy efficiency distribution according to an operating point and is capable of providing a high torque in only a high-speed range, the motor has a relatively small difference in efficiency with respect to an operating point, and it is possible to implement a low speed and high torque with only a characteristic of the motor alone.

In addition, in a vehicle equipped with the existing internal combustion engine drive system, an acceleration mechanism such as a torque converter or a clutch is required due to a characteristic of the internal combustion engine which cannot be driven at a low speed, but in a driving system of the EV, since the motor has a characteristic of being easily driven at a low speed, an acceleration mechanism may be omitted. In the EV, due to the characteristic of the driving system, an inherent vibration characteristic generated due to a torsional damper or a dual mass flywheel, which is used in the driving system of the internal combustion engine vehicle, cannot occur.

As a result of these mechanical differences, unlike the internal combustion engine vehicle, the EV can provide smooth driving without interruption in driving ability due to gear shift. Since the driving system of the EV generates power by driving the motor with electric power of the battery instead of generating electric power by burning fuel like the conventional internal combustion engine vehicle, unlike a torque of an internal combustion engine, a torque of the EV has a characteristic which is generally precise and smooth and has fast reactivity.

Such a characteristic acts as a positive aspect of the EV. However, the absence of an internal combustion engine, a transmission, and a clutch may produce boredom in a driver who is desirous of driving fun. In the case of a high-performance vehicle field, various effects generated due to noise, physical vibration, and thermodynamic actions of the internal combustion engine may be considered important emotionally. One among components which are difficult to provide in the EV due to its characteristic is a sound generated when a high-performance vehicle is traveling.

For example, there is a tire slip sound that may frequently occur during driving due to a driving characteristic in the high-performance vehicle. Thus, there is a need for a method of producing a virtual tire slip sound in an EV to allow a driver to feel as if the driver is driving a high-performance internal combustion engine vehicle.

SUMMARY

In one aspect, the present disclosure provides a method of generating a tire slip sound in a vehicle, which is capable of producing a virtual tire slip sound in a driving situation in which a tire slip may occur during vehicle driving.

Objectives of the present disclosure are not limited to the above-described objectives, and other objectives of the present disclosure, which are not mentioned, can be understood by the following description and also will be apparently understood through embodiments of the present disclosure. Further, the objectives of the present disclosure can be implemented in the manner described in the appended claims and a combination thereof.

In an exemplary embodiment, the present disclosure provides a method of generating a virtual tire slip sound in a vehicle, which includes collecting, by a controller, vehicle driving information while a vehicle is traveling; determining, by the controller, a characteristic of a virtual tire slip sound based on the collected vehicle driving information; generating and outputting, by the controller, a tire slip signal for generating and outputting the virtual tire slip sound according to the determined characteristic; and operating sound equipment of the vehicle according to the tire slip signal output from the controller to generate and output the virtual tire slip sound according to a vehicle driving state.

As provided herein, the vehicle driving information may include a steering wheel angle according to a steering wheel operation of a driver, and a slip angle and a slip rate of a wheel.

In addition, in the determining of the characteristic of the virtual tire slip sound, the controller may determine a lateral tire force and a longitudinal tire force of a corresponding wheel from the slip angle and the slip rate of the wheel of the vehicle driving information and determine the characteristic of the virtual tire slip sound using vehicle driving information further including the determined lateral tire force and the longitudinal tire force.

In addition, the characteristic of the virtual tire slip sound may include a sound generation timing at which the virtual tire slip sound is output through the sound equipment.

The controller may determine, as a sound generation timing, a timing at which both a condition in which the steering wheel angle of the collected vehicle driving information is greater than or equal to a preset reference angle and a condition in which each of the determined lateral tire force and the determined longitudinal tire force is greater than or equal to a preset reference value are satisfied.

In addition, the characteristic of the virtual tire slip sound may further include one or two of a volume of the virtual tire slip sound and a pitch indicating a height of the virtual tire slip sound.

In addition, the controller may determine the volume and the pitch of the virtual tire slip sound as values according to the determined lateral tire force by setting data in which a correlation between the lateral tire force and the volume is set in advance, and setting data in which a correlation between the lateral tire force and the pitch is set in advance.

In addition, in the setting data, as a value of the lateral tire force becomes larger, the volume and the pitch of the virtual tire slip sound may be set to larger values.

In addition, the controller may determine the volume and the pitch of the virtual tire slip sound as values according to the determined slip angle of the wheel by setting data in which a correlation between the slip angle of the wheel and the volume is set in advance, and setting data in which a correlation between the slip angle of the wheel and the pitch is set in advance.

In addition, in the setting data, as a value of the slip angle of the wheel becomes larger, the volume and the pitch of the virtual tire slip sound may be set to larger values.

In addition, the vehicle driving information may further include a pressure and a temperature of a tire of the wheel, and the controller may correct the characteristic of the virtual tire slip sound, which is determined using the vehicle driving information further including the lateral tire force and the longitudinal tire force, based on tire pressure and temperature information of the vehicle, and generate the tire slip signal using the corrected characteristic of the virtual tire slip sound.

In addition, the controller may determine the characteristic of the virtual tire slip sound for each wheel of the vehicle, generate and output the tire slip signal for each wheel according to the determined characteristic of the virtual tire slip sound for each wheel, and operate the sound equipment to output the virtual tire slip sound for each wheel through a speaker, provided in a direction in which each wheel is located, according to the tire slip signal for each wheel.

Other aspects and preferred embodiments of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
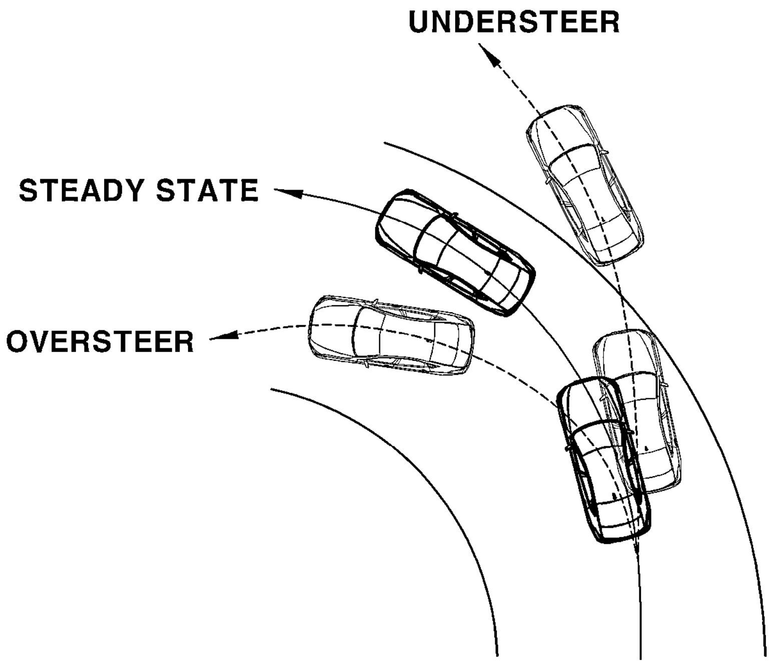
FIG. 1 is a diagram illustrating an understeer state and an oversteer state of a vehicle.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structures or functional descriptions presented in the embodiments of the present disclosure are merely exemplified for the purpose of describing the embodiments according to the concept of the present disclosure, and the embodiments according to the concept of the present disclosure may be implemented in various forms. In addition, the present disclosure should not be construed to be limited to the embodiments described in the present specification, and should be understood to include all modifications, equivalents, or substitutes within the spirit and technical scope of the present disclosure.

Meanwhile, the terms first, second, and/or the like in the present disclosure may be used to describe various components, but the components are not be limited by these terms. These terms may be used only for the purpose of distinguishing one component from another component, and, for example, a first component may be referred to as a second component, and similarly, the second component may also be referred to as the first component without departing from the scope according to the concept of the present disclosure.

When a component is referred to as being "connected" or "coupled" to another component, it may be directly connected or coupled to another component, but it should be understood that sill another component may be present between the component and another component. On the contrary, when a component is referred to as being "directly connected to," or "directly in contact with" another component, it should be understood that still another component is not present between the component and another component. Other expressions for describing the relationship between components, that is, "between" and "immediately between," or "adjacent to" and "directly adjacent to" should also be construed in the same manner.

Throughout the present specification, the same reference numerals indicate the same components. Terms used herein are for the purpose of describing the embodiments and are not intended to limit the present disclosure. In the present specification, the singular forms include the plural forms unless the context clearly dictates otherwise.

Hereinafter, exemplary embodiments of the present disclosure will be described in detail with reference to the accompanying drawings.

The present disclosure is applicable to an electric vehicle and relates to a method of generating a tire slip sound, which is capable of producing a virtual tire slip sound in a driving situation in which a tire slip may occur during vehicle driving.

In the present disclosure, the generation of a virtual tire slip sound or the virtual production of a tire slip sound refers to an audible production of generating and outputting a sound effect simulating a tire slip sound through sound equipment. More specifically, the production of a virtual tire slip sound or the virtual production of a tire slip sound may mean an audible production in which a sound effect simulating a tire slip sound in an internal combustion engine vehicle is output through a speaker of the sound equipment in the electric vehicle.

The present disclosure is characterized in that a characteristic of a virtual tire slip sound is determined by using vehicle driving information collected by a vehicle during driving, a tire slip signal including determined characteristic information on the virtual tire slip sound is generated, and then the sound equipment is operated according to the generated tire slip signal to generate and output a virtual tire slip sound.

In particular, in the present disclosure, lateral tire force information on front and rear wheels may be used as the vehicle driving information for determining the characteristic of the virtual tire slip sound. In addition, in the present disclosure, wheel slip angle information may be used to determine lateral tire forces of the front and rear wheels.

In order to aid understanding of the present disclosure, a slip angle and a cornering force of the vehicle, which is traveling, will be described as follows.

Figure 2:
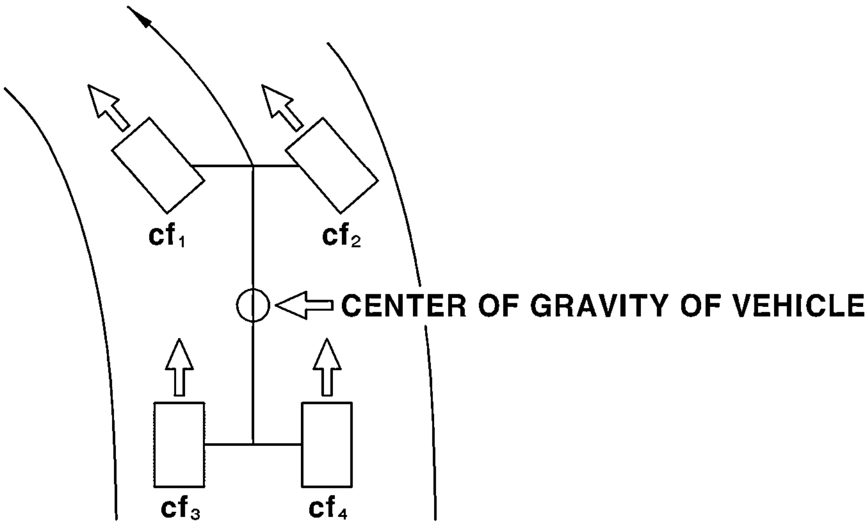
FIG. 2 is a diagram illustrating a center of gravity of the vehicle and a tire cornering force of each wheel.
Figure 3:
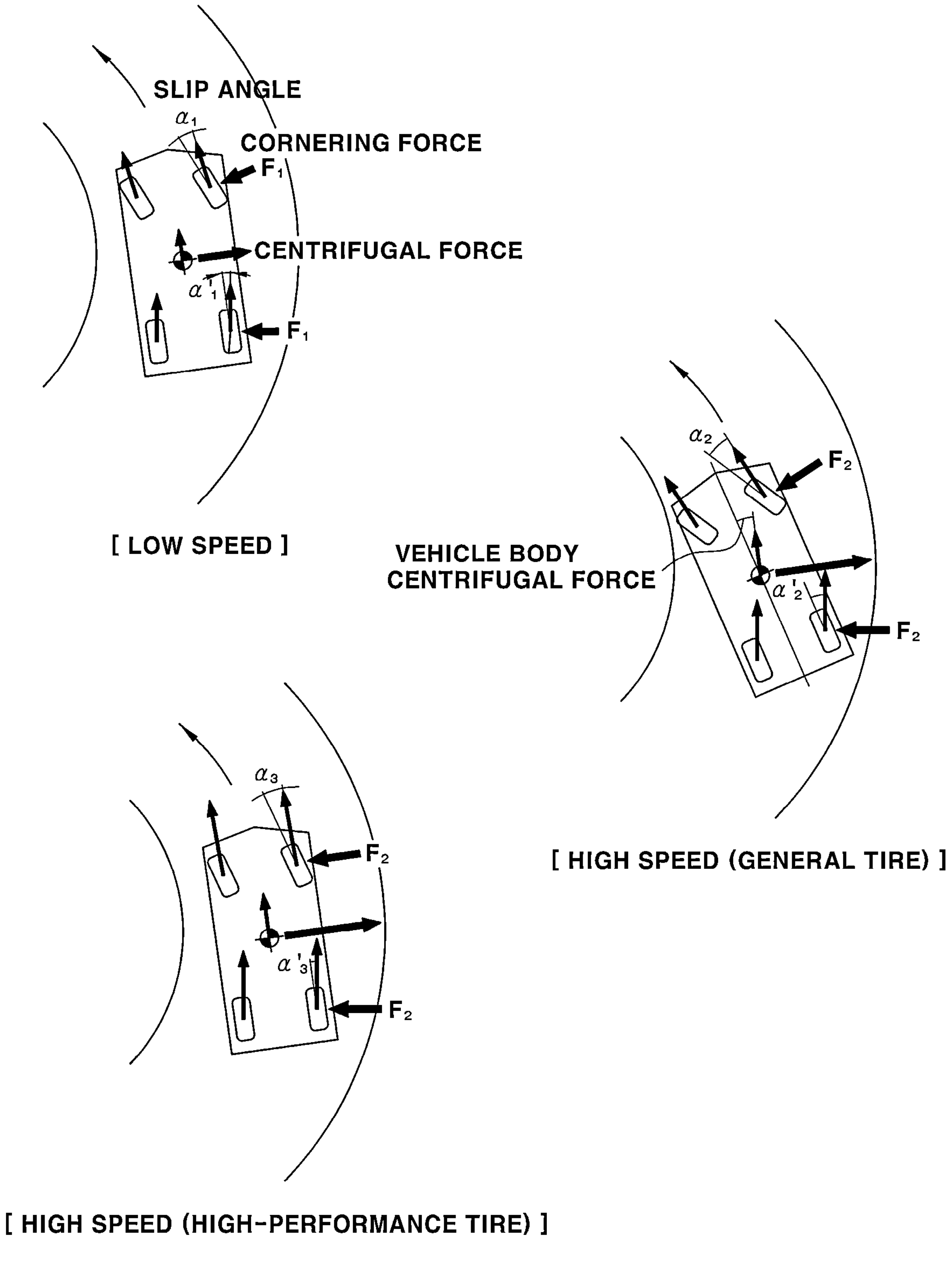
FIG. 3 is a diagram illustrating a slip angle and a cornering force of a wheel during cornering driving of the vehicle.
Figure 4:
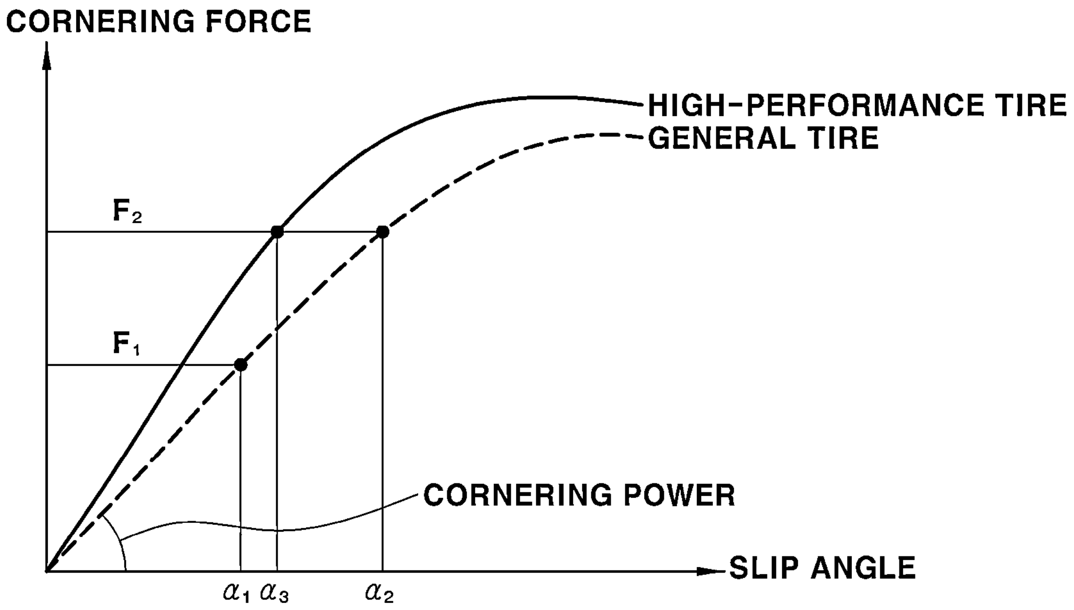
FIG. 4 is a graph showing a comparison of slip angles of a general tire and a high-performance tire.
Figure 5:
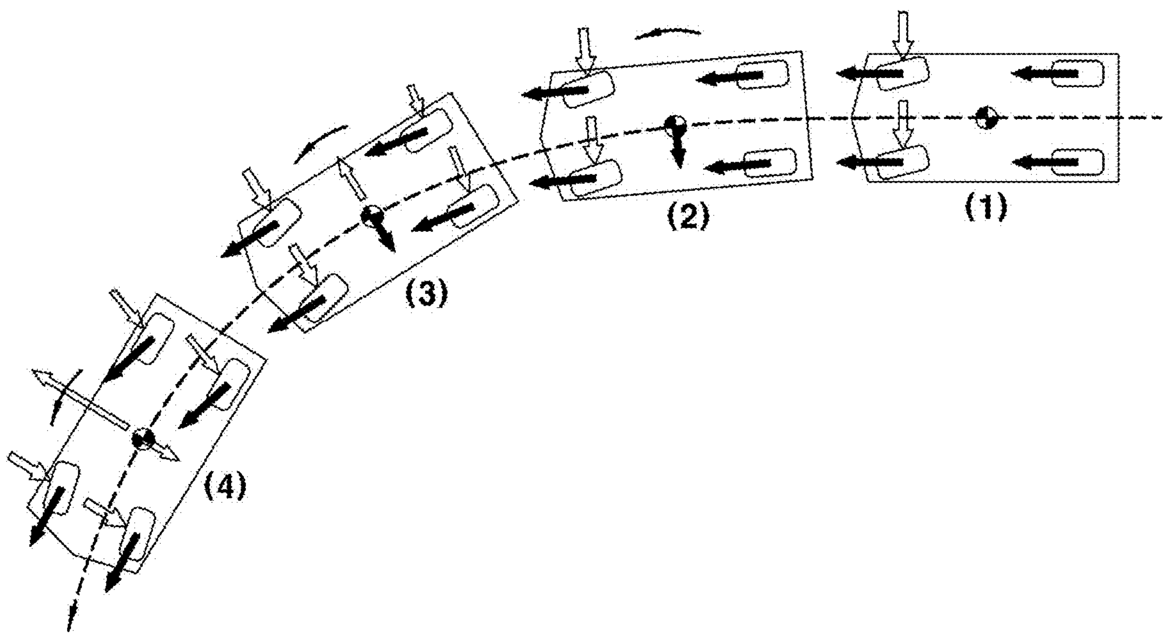
FIG. 5 is a diagram for describing a vehicle state during the cornering driving of the vehicle.

FIGS. 1 to 5 are diagrams for describing properties of a vehicle, where FIG. 1 is a diagram illustrating an understeer state and an oversteer state of the vehicle, and FIG. 2 is a diagram illustrating a center of gravity of the vehicle and a tire cornering force of each wheel. In addition, FIG. 3 is a diagram illustrating a slip angle and a cornering force of a wheel during cornering driving of the vehicle, and FIG. 4 is a graph showing a comparison of slip angles of a general tire and a high-performance tire. FIG. 5 is a diagram for describing a vehicle state during the cornering driving of the vehicle.

While the vehicle travels, a tire slip rate generates a longitudinal tire force, and the slip angle generates a lateral tire force. In addition, when a driver operates a steering wheel so as to turn while driving straight ahead, a centrifugal force acts on a center of gravity of the vehicle and thus the vehicle tries to move outward, and in order to allow the vehicle to turn stably, a wheel needs a force which is balanced with the centrifugal force. Such a force is referred to as a cornering force.

When a moment due to a cornering force generated in the rear wheel is greater than the front wheel of the vehicle, even when a steering angle is constant, a cornering radius is increased as the vehicle is pushed outward, and such a phenomenon is referred to an understeer phenomenon.

In contrast, when a moment due to a cornering force generated in the front wheel becomes greater than the rear wheel of the vehicle for some reason, even when the steering angle is constant, a phenomenon in which the front wheel of the vehicle is rolled inward occurs so that the cornering radius is decreased. As a result, an oversteer phenomenon in which the vehicle crosses over a next lane (or the centerline) to come into contact with another vehicle or turns to deviate from a lane, occurs.

FIG. 1 illustrates a steady state, an oversteer state, and an understeer state when the vehicle is cornering. In the steady state, a centrifugal force acting on the center of gravity of the vehicle is balanced with the sum of lateral tire forces of all wheels. That is, in FIG. 2, when $cf_1$, $cf_2$, $cf_3$, and $cf_4$ are tire cornering forces at the wheels, it becomes "$cf_1+cf_2+cf_3+cf_4$=centrifugal force."

FIG. 3 illustrates cornering forces and slip angles when the vehicle is traveling at low speed and high speed, and when the vehicle is traveling at high speed, slip angles of a general tire and a high-performance tire are compared and shown. In addition, FIG. 4 illustrates a comparison of the slip angles and the cornering forces of the general tire and the high-performance tire.

During actual driving, lateral forces at low, medium, and high speeds are design factors, and the high-performance tire is designed to have a slip angle that is relatively smaller than a cornering force when compared to the general tire. In FIGS. 3 and 4, $\alpha_1$, $\alpha_2$, and $\alpha_3$ denote tire slip angles, and $F_1$ and $F_2$ denote cornering forces. Referring to FIG. 4, it can be seen that, in a condition in which the cornering forces are the same as each other, a slip angle $\alpha_3$ of the high-performance tire is designed to be smaller than a slip angle $\alpha_2$ of the general tire.

Next, during cornering driving, a vehicle state will be described with reference to FIG. 5. First, as shown in FIG. 5 (1), when a driver rotates the steering wheel in a state in which the vehicle is traveling straight ahead, since the vehicle continues to move straight ahead due to inertia, slip angles occurs in the front wheels.

In addition, as shown in FIG. 5 (2), cornering forces are generated in the front wheels in which the slip angles occur, and these forces initiate a lateral movement of the vehicle and, simultaneously, initiate a yaw movement of the vehicle, which is a rotational movement around the center of gravity of the vehicle. In this case, the rear wheels receive forces to a left side due to the lateral movement and receive forces to a right side due to the yaw movement, so that the vehicle is substantially traveling straight ahead.

Subsequently, as shown in FIG. 5 (3), when the yaw movement further proceeds, the rear wheels move to the right side (an outer side) in FIG. 5 (3) so that slip angles occur even in the rear wheels. As a result, as shown in FIG. 5 (4), the cornering forces are generated in the front and rear wheels, and the cornering forces of all the wheels are balanced with the centrifugal force, so that the vehicle reaches a normal cornering state.

Meanwhile, a virtual tire slip sound of an electric vehicle, which is to be provided by the present disclosure, is an event sound generated in a specific driving state of the vehicle. In addition, the virtual tire slip sound is a virtual sound which is virtually generated and output when the vehicle is cornering in consideration of driving emotion of the driver. As described above, when the virtual tire slip sound is provided, in addition to communicating emotional quality (e.g., a positive emotional reaction experienced by a vehicle occupant) of the vehicle, there is an advantage of improving marketability of the electric vehicle in which the driver may experience a driving feeling of a high-performance vehicle in the electric vehicle.

Figure 6:
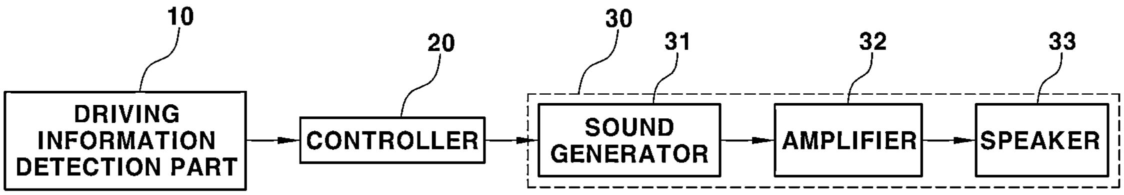
FIG. 6 is a block diagram illustrating a configuration of a device for generating a virtual tire slip sound according to the present disclosure.

FIG. 6 is a block diagram illustrating a configuration of a device for generating a virtual tire slip sound according to the present disclosure. As shown in FIG. 6, a device for generating a virtual tire slip sound according to the present disclosure includes a driving information detection part 10 configured to detect vehicle driving information required to generate a virtual tire slip sound in a vehicle, a controller 20 configured to determine a characteristic of the virtual tire slip sound and generate and output a tire slip signal representing the determined characteristic based on the vehicle driving information detected by the driving information detection part 10, and sound equipment 30 configured to be operated to output the virtual tire slip sound according to the characteristic in response to the tire slip signal output from the controller 20.

The driving information detection part 10 preferably includes a sensor configured to detect the vehicle driving information required to generate the virtual tire slip sound. In this case, the vehicle driving information may be information necessary to obtain a lateral tire force and a longitudinal tire force of the wheel during driving.

In addition, the vehicle driving information may further include a steering wheel angle according to a steering wheel operation state due to the driver, and the steering wheel angle may be detected by a steering angle sensor as in a conventional vehicle. In addition, the vehicle driving information may further include a pressure and a temperature of each tire, which are detected by a sensor, as tire state information.

In addition, the sound equipment 30 may include a sound generator 31 configured to process the tire slip signal output from the controller 20 and output a sound signal for generating a sound, an amplifier 32 configured to be operated according to the sound signal and to reproduce and output the virtual tire slip sound, and a speaker 33 such as a woofer. In this case, a single speaker 33, more preferably, a plurality of speakers 33 may be installed in the vehicle interior to be used to output the virtual tire slip sound.

According to one embodiment of the present disclosure, the lateral tire force and the longitudinal tire force may be obtained from a real-time slip angle and a real-time slip rate of a corresponding wheel, respectively, and the slip angle may be obtained from a tire steering angle detected by the sensor. In addition, as known in the art, the slip rate may be estimated from a vehicle body speed and a wheel speed which are detected by a sensor.

In this case, in order to obtain the lateral tire force, additional information including cornering and driving rigidity and tire rigidity per unit vertical load is required. With this information, a preset constant may be applied according to configurations of vehicle parts. Acquisition of the longitudinal tire force may also require additional information. This information allows a preset constant to be applied.

In one embodiment of the present disclosure, as described above, in order to collect the vehicle driving information, the driving information detection part 10 may include a sensor for detecting a tire steering angle, a sensor for detecting a vehicle body speed and a wheel speed, and a sensor for detecting a steering wheel angle. In addition, the driving information detection part 10 may further include a sensor for detecting a temperature and a pressure of the tire. Sensor detection information detected by these sensors during driving is input to the controller 20 in real time, and the controller 20 acquires necessary information including a lateral tire force and a longitudinal tire force using the sensor detection information and determines the characteristic of the virtual tire slip sound based on the acquired information.

In one embodiment of the present disclosure, a value obtained by averaging lateral tire forces of all wheels and a value obtained by averaging longitudinal tire forces of all wheels may be used as the tire lateral force and the tire longitudinal force which are required to reproduce the virtual tire slip sound. Alternatively, instead of all the wheels, a value obtained by averaging lateral tire forces of front left and right wheels and a value obtained by averaging longitudinal tire forces of the front left and right wheels may be used. In addition, an average value of the front left and right wheels or an average value of all the wheels may also be used as a temperature and a pressure of the tire.

Alternatively, instead of using the average values, it is possible to acquire a lateral tire force and a longitudinal tire force for each wheel and temperature and pressure information, which is the tire state information, with respect to some or all of the wheels, determine a characteristic of a tire slip sound for each wheel based on the acquired information, and output the virtual tire slip sound having the determined characteristic for each wheel through each indoor speaker 33 in a direction of a corresponding wheel.

As provided herein, some or all of the wheels may be the front left wheel and the front right wheel. That is, a virtual tire slip sound of a front left wheel FL among the front wheels and a virtual tire slip sound of a front right wheel FR thereamong are output through speakers installed, respectively, at the front left and the front right in the vehicle interior.

Alternatively, the virtual tire slip sounds may be output through speakers installed, respectively, at the front left (FL), the front right (FR), the rear left (RL), and the rear right (RR) in the vehicle, which correspond to the wheels in the respective directions (FL, FR, RL, RR).

Alternatively, instead of individually generating and outputting the virtual tire slip sounds with respect to all four wheels as described above, it is possible to generate and output the virtual tire slip sound by only distinguishing the front wheels from the rear wheels. That is, without distinguishing the front wheels from the rear wheels, it is possible to output the virtual tire slip sound of the front wheel through a front speaker of the vehicle interior using the average value information of the front left and right wheels and output the virtual tire slip sound of the rear wheel through a rear speaker of the vehicle interior using the average value information of the rear left and right wheels.

As described above, in order to individually generate and output the virtual tire slip sound with respect to all the wheels, it is possible to determine individual characteristics of the virtual tire slip sound for each wheel using individual information for each wheel and, subsequently, generate and output the individual virtual tire slip sounds, which are independent from each other, for each wheel through each of the front, rear, left and right speakers in the vehicle interior.

Alternatively, it is possible to generate and output individually independent virtual tire slip sounds of the front and rear wheels, which are divided into only the front and rear wheels, using the average value information of the left and right wheels. Alternatively, in a state of excluding the rear wheels from a target, it is possible to generate and output an integrated virtual tire slip sound of the front wheels using the average value information of the front left and right wheels or generate and output individual virtual tire slip sounds with respect to the front left and right wheels.

Figure 7A:
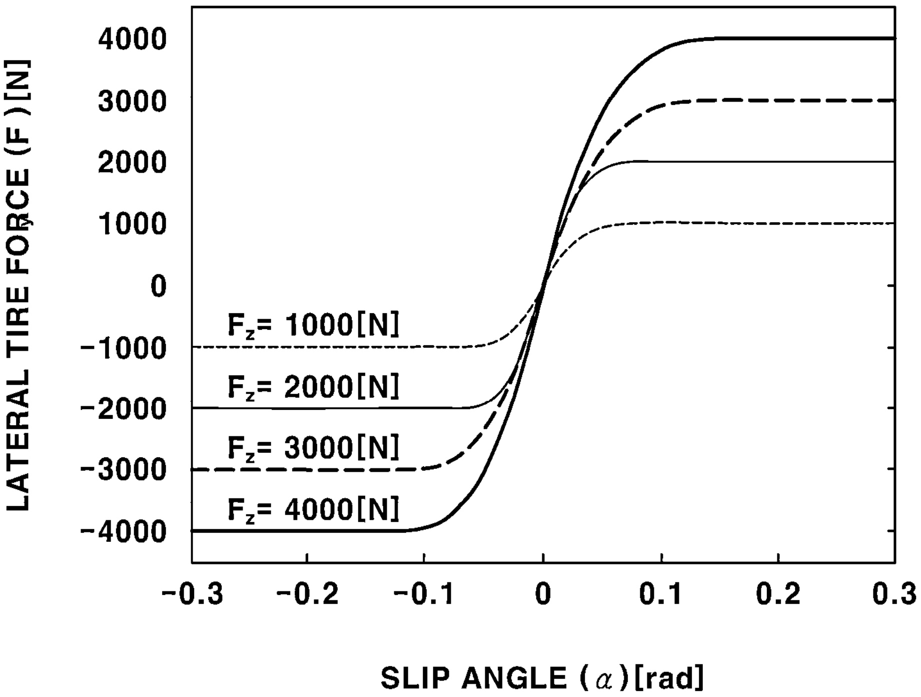
FIG. 7A is a graph showing a correlation between a slip angle of a wheel and a lateral tire force according to one embodiment of the present disclosure.
Figure 7B:
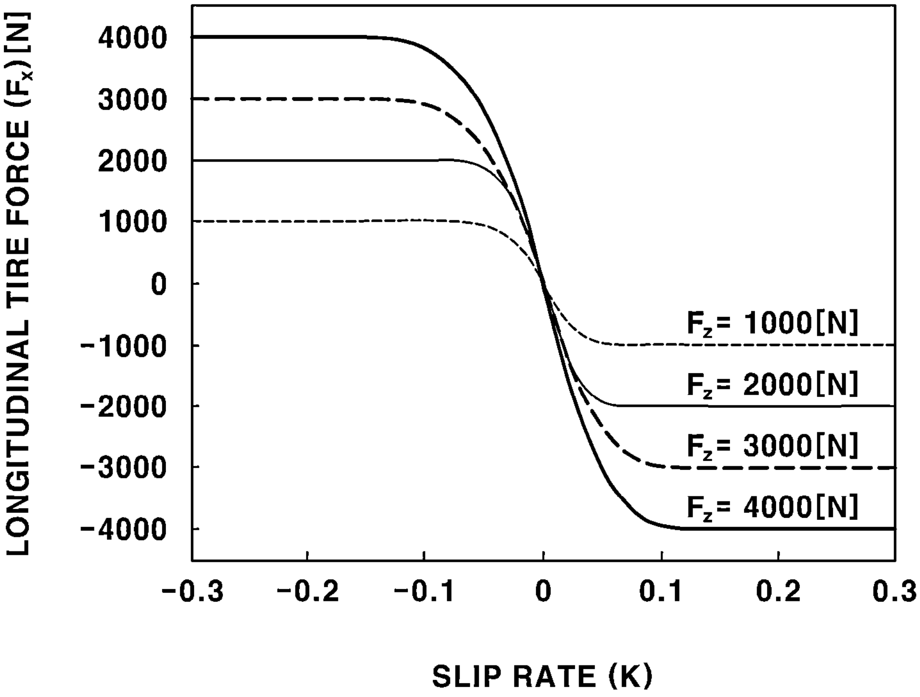
FIG. 7B is a graph showing a correlation between a slip angle of a wheel and a longitudinal tire force according to one embodiment of the present disclosure.

FIG. 7A is a graph showing a correlation between a slip angle $\alpha$ of a wheel and a lateral tire force $F_y$ according to one embodiment of the present disclosure, and FIG. 7B is a graph showing a correlation between a slip rate k of the wheel and a longitudinal tire force $F_x$ according to one embodiment of the present disclosure. In each drawing, "$F_z$" is a longitudinal tire force (a force in a vertical direction or a longitudinal load) and is information related to a tire grip force. In each drawing, a plurality of lateral tire force graphs representing a lateral tire force $F_y$ according to a slip angle $\alpha$ for each "$F_z$" and a plurality of longitudinal tire force graphs representing a longitudinal tire force $F_x$ according to a slip rate k for each "$F_z$" are illustrated.

In practicing the present disclosure, one selected from among the plurality of illustrated lateral force graphs and the plurality of illustrated longitudinal force graphs may be used, and one among the plurality of graphs may be selectively used according to a type of a tire mounted on a target vehicle. The graphs of FIGS. 7A and 7B are used in determining the lateral tire force $F_y$ and the longitudinal tire force $F_x$, which are information required to generate the virtual tire slip sound in one embodiment of the present disclosure, from the slip angle $\alpha$ and the slip rate k and are setting data in which the lateral tire force $F_y$ is set according to the slip angle $\alpha$ and setting data in which the longitudinal tire force $F_x$ is set according to the slip rate k. The setting data as shown in FIGS. 7A and 7B are input and stored in the controller 20 in advance and used to determine the lateral tire force $F_y$ and the longitudinal tire force $F_x$ from the slip angle $\alpha$ and the slip rate k.

Generally, in the case of a high-performance vehicle, a tire having an excellent grip force is used, and as a longitudinal tire force becomes larger, the tire has an excellent grip force. Thus, in the case of a vehicle such as a high-performance vehicle using a tire having an excellent grip force, a graph of "Fz=4000[N]" among the graphs of FIGS. 7A and 7B may be used.

In contrast, in the case of a general vehicle using a tire having a relatively low grip force, a graph in which a longitudinal tire force is low may be used, and a graph close to Fz=1000[N] may be used for a vehicle using a tire having a low grip force.

As described above, in the embodiment of the present disclosure, the lateral tire force $F_y$ and the longitudinal tire force $F_x$, which are information necessary to generate the virtual tire slip sound, may be determined using the setting data of FIG. 7A in which a correlation between the slip angle $\alpha$ and the lateral tire force $F_y$ is established, and the setting data of FIG. 7B in which a correlation between the slip rate k and the longitudinal tire force $F_x$ is established. That is, the lateral tire force $F_y$ may be determined from the slip angle $\alpha$ using the setting data as shown in FIG. 7A, and the longitudinal tire force $F_x$ may be determined from the slip rate k using the setting data as shown in FIG. 7B.

In addition, in the embodiment of the present disclosure, instead of using the setting data of FIGS. 7A and 7B as described above, values estimated according to a preset logic preset in the controller 20 based on information and setting data collected in real time through sensors in the vehicle may be used as the lateral tire force $F_y$ and the longitudinal tire force $F_x$.

Various methods of estimating a lateral tire force and a longitudinal tire force during driving are known to those skilled in the art, and one thereamong may be applied. Since the lateral tire force or the longitudinal tire force is a control variable which is already widely used in vehicle control, a detailed description of a calculation or estimation method thereof will be omitted from the present specification.

In addition, various methods of acquiring slip angle and slip rate information from a sensor detection signal in real-time in a vehicle are also known to those skilled in the art, and one thereamong may be applied. Since the slip angle and the slip rate are control variables which are already widely used in the vehicle control, a detailed description of an acquisition method thereof will be omitted from the present specification.

Figure 8A:
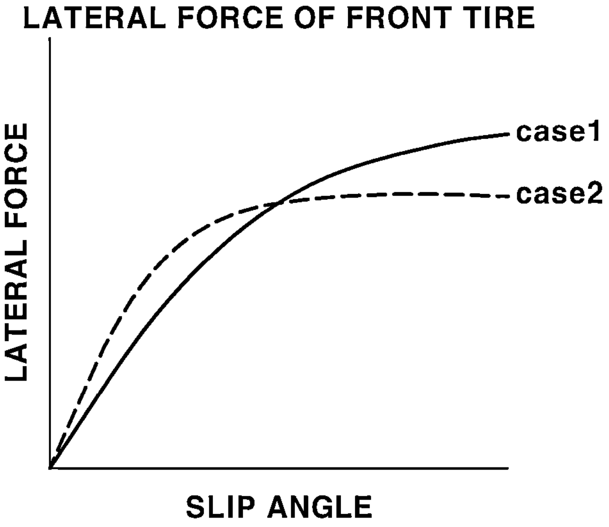
FIGS. 8A and 8B are graphs showing another example of setting data in which a correlation between a slip angle of a wheel and a lateral tire force is set according to one embodiment of the present disclosure.
Figure 8B:
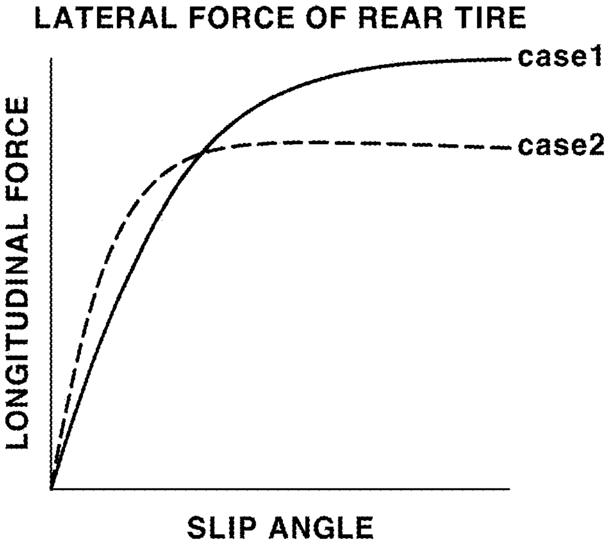

FIGS. 8A and 8B are graphs showing another example of setting data in which a correlation between a slip angle of a wheel and a lateral tire force is set according to one embodiment of the present disclosure, FIG. 8A illustrates a lateral force of a front wheel tire, and FIG. 8B illustrates a lateral force of a rear wheel tire. In the illustrated example, the lateral force of the front wheel tire and the lateral force of the rear wheel tire may be an average of the lateral forces of the left wheels and an average of the lateral forces of the right wheels, respectively.

In addition, "case1" and "case2" in FIGS. 8A and 8B are data in which correlations are differently set according to a component configuration design factor of the vehicle and are data which are distinguished and set according to cornering grip performance of the vehicle, and one of "case1" and "case2" may be used.

Meanwhile, in the embodiment of the present disclosure, the characteristic of the virtual tire slip sound may include a sound generation timing and may further include one or two of a volume and a pitch of the virtual tire slip sound in addition to the sound generation timing. As provided herein, the sound generation timing is a timing at which the virtual tire slip sound starts to be generated and output.

In an embodiment of the present disclosure, in determining the characteristic of the virtual tire slip sound, the controller 20 may be set to determine the sound generation timing based on the steering wheel angle detected by a sensor (a conventional steering angle sensor) and the lateral tire force and the longitudinal tire force which are determined from the slip angle and the slip rate.

That is, the controller 20 determines whether a condition in which the detected steering wheel angle is greater than or equal to a preset reference angle is satisfied and a condition in which both of the determined lateral tire force and the determined longitudinal tire force are greater than or equal to a preset reference value is satisfied. In this case, when it is determined that all the above conditions are satisfied, the controller 20 determines a timing at which the conditions are satisfied as the sound generation timing.

In addition, the controller 20 may be set to determine a sound volume or a sound pitch of the characteristic of the virtual tire slip sound based on the lateral tire force or to determine both the sound volume and the sound pitch. In this case, it is possible to use setting data defining a correlation between the lateral tire force and the sound volume and setting data defining a correlation between the lateral tire force and the sound pitch. For example, the setting data may be a map, a table, a graph, an equation, or the like. In this case, in addition to the lateral tire force, the longitudinal tire force may be used as a control variable.

In addition, the sound volume may be determined as a larger value as the lateral tire force is increased according to the setting data in the controller 20. Alternatively, the sound volume may be determined as a larger value as the lateral tire force and the longitudinal tire force are increased according to the setting data in the controller 20. Alternatively, the sound volume may be determined as a larger value as the slip angle of the wheel is increased instead of the lateral tire force and the longitudinal tire force. Alternatively, the sound volume may be determined as a larger value as the slip angle and the slip rate of the wheel are increased.

Together with the sound volume, the sound pitch indicating a height of a sound may also be determined as a larger value as the lateral tire force is increased, the lateral tire force and the longitudinal tire force are increased, the slip angle of the wheel is increased, or the slip angle and the slip rate of the wheel are increased, in the same manner as in the sound volume.

In an embodiment of the present disclosure, as described above, in determining the characteristic of the virtual tire slip sound from the information including the lateral tire force, the longitudinal tire force, the slip angle, and the slip rate, the controller 20 may use setting data in which a correlation between the vehicle driving information and the sound volume or the sound pitch is set in advance.

In addition, in an embodiment of the present disclosure, the controller 20 may be set to further correct the characteristic of the virtual tire slip sound based on tire state information of a corresponding wheel detected by the sensor, that is, a pressure or a temperature of the tire, or tire pressure and temperature information. For example, the sound volume or the sound pitch, which is determined by the setting data, may be corrected according to the pressure and the temperature of the tire.

As described above, after determining the characteristic of the virtual tire slip sound, the controller 20 generates and outputs the tire slip signal including the determined characteristic information to allow the virtual tire slip sound according to the tire slip signal to be reproduced in the sound equipment 30. That is, the controller 20 generates and outputs the tire slip signal, and at this time, the sound equipment 30 generates and outputs the virtual tire slip sound according to a vehicle driving state and a wheel state based on the tire slip signal through the speaker 33 in the vehicle.

In particular, as described above, first, when the controller 20 generates and outputs the tire slip signal matching the characteristic of the virtual tire slip sound, the tire slip signal is transmitted to the sound generator 31 of the sound equipment 30.

Subsequently, the sound generator 31 corrects a sound volume or a sound pitch of a reference sound source of the stored virtual tire slip sound using the tire slip signal output from the controller 20 and then processes the corrected sound source to generate and output a sound signal. Thus, the sound signal output from the sound generator 31 is amplified through the amplifier 32 and then output to each of the speakers 33 in the vehicle so that the virtual tire slip sound may be provided to a vehicle interior.

Figure 9:
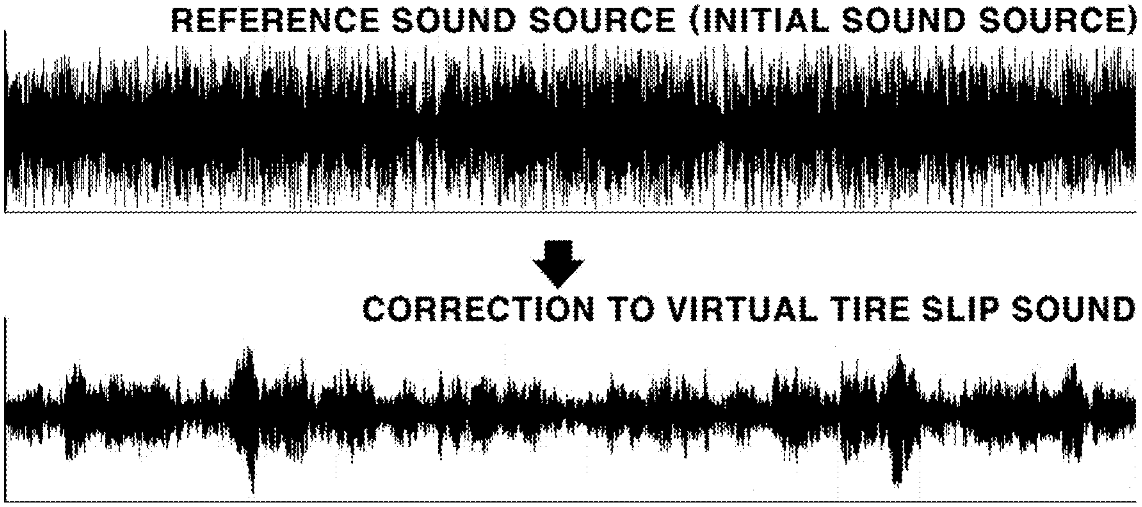
FIG. 9 is a diagram illustrating signal waveforms representing a reference sound source and a virtual tire slip sound corrected therefrom according to one embodiment of the present disclosure.

FIG. 9 is a diagram illustrating signal waveforms representing a reference sound source and a virtual tire slip sound corrected therefrom according to one embodiment of the present disclosure. As shown in FIG. 9, the sound volume or the sound pitch of the reference sound source signal is corrected based on the tire slip signal so that the sound signal of the virtual tire slip sound may be finally generated.

As described above, according to the present disclosure, the virtual tire slip sound may be reproduced and output through the speaker according to the vehicle driving state in the electric vehicle so that marketability and emotional quality (e.g., a positive emotional reaction experienced by a vehicle occupant) of the electric vehicle may be improved.

In accordance with a method of generating a virtual tire slip sound in a vehicle according to the present disclosure, a tire slip sound which is frequently generated in a high-performance vehicle during driving is virtually produced, and a virtual tire slip sound is realistically generated and output through a speaker in the vehicle so that a driver can experience a feeling as if driving the high-performance vehicle.

In particular, when the method of generating a virtual tire slip sound in a vehicle according to the present disclosure is applied to an electric vehicle, the driver driving the electric vehicle can experience a feeling as if driving a high-performance internal combustion engine vehicle so that marketability and emotional quality of the electric vehicle can be improved.

Although the embodiments of the present disclosure have been described in detail, the scope of the prevent disclosure is not limited to these embodiments, and various modifications and improvements devised by those skilled in the art using the fundamental concept of the present disclosure, which is defined by the appended claims, further fall within the scope of the present disclosure.

What is claimed is:

1. A method of generating a virtual tire slip sound in a vehicle, the method comprising:

collecting, by a controller, vehicle driving information while the vehicle is traveling;

determining, by the controller, a characteristic of the virtual tire slip sound based on the collected vehicle driving information;

generating and outputting, by the controller, a tire slip signal for generating and outputting the virtual tire slip sound according to the determined characteristic;

operating sound equipment of the vehicle according to the tire slip signal output from the controller to generate and output the virtual tire slip sound according to a vehicle driving state; and correcting, by a sound generator, a sound volume or a sound pitch of a reference sound source of the virtual tire slip sound using the tire slip signal output from the controller and then processing the corrected reference sound source to generate and output a sound signal, wherein the controller determines the characteristic of the virtual tire slip sound for each wheel of the vehicle, generates and outputs the tire slip signal for each wheel according to the determined characteristic of the virtual tire slip sound for each wheel, and operates the sound equipment to output the virtual tire slip sound for each wheel through a speaker, provided in a direction in which each wheel is located, according to the tire slip signal for each wheel, and wherein, as a value of a slip angle of the each wheel becomes larger, the sound volume and the sound pitch of the virtual tire slip sound are set to larger values.

2. The method of claim 1, wherein the vehicle driving information includes a steering wheel angle according to a steering wheel operation of a driver, and the slip angle and a slip rate of a wheel.

3. The method of claim 2, wherein in determining the characteristic of the virtual tire slip sound, the controller determines a lateral tire force and a longitudinal tire force of the wheel from the slip angle and the slip rate of the wheel of the vehicle driving information and determines the characteristic of the virtual tire slip sound using vehicle driving information further including the determined lateral tire force and the longitudinal tire force.

4. The method of claim 3, wherein the characteristic of the virtual tire slip sound includes a sound generation timing at which the virtual tire slip sound is output through the sound equipment.

5. The method of claim 4, wherein the controller determines a timing, at which a condition in which the detected steering wheel angle is greater than or equal to a preset reference angle is satisfied and a condition in which both of the determined lateral tire force and the determined longitudinal tire force are greater than or equal to a preset reference value is satisfied, as the sound generation timing.

6. The method of claim 4, wherein the characteristic of the virtual tire slip sound further includes at least one of the sound volume of the virtual tire slip sound or the sound pitch indicating a height of the virtual tire slip sound.

7. The method of claim 6, wherein in the controller, the sound volume and the sound pitch of the virtual tire slip sound are determined as values according to the determined lateral tire force by setting data in which a correlation between the lateral tire force and the sound volume is set in advance, and setting data in which a correlation between the lateral tire force and the sound pitch is set in advance.

8. The method of claim 7, wherein in setting the data, as a value of the lateral tire force becomes larger, the sound volume and the sound pitch of the virtual tire slip sound are set to larger values.

9. The method of claim 6, wherein in the controller, the sound volume and the sound pitch of the virtual tire slip sound are determined as values according to the determined slip angle of the wheel by setting data in which a correlation between the slip angle of the wheel and the volume is set in advance, and setting data in which a correlation between the slip angle of the wheel and the sound pitch is set in advance.

10. The method of claim 3, wherein:

the vehicle driving information further includes a pressure and a temperature of a tire of the wheel; and the controller corrects the characteristic of the virtual tire slip sound, which is determined using the vehicle driving information further including the lateral tire force and the longitudinal tire force, based on tire pressure and temperature information of the vehicle, and generates the tire slip signal using the corrected characteristic of the virtual tire slip sound.

* * * * *